United States Patent [19]
Vail et al.

[11] 3,896,792
[45] July 29, 1975

[54] REAL-TIME CYCLIC PULMONARY FUNCTION TEST SYSTEM

[75] Inventors: Edwin G. Vail, Lynn Haven; Maxwell W. Lippitt, Jr., Panama City; Phillip D. Seymour, Lynn Haven, all of Fla.

[73] Assignee: The United States of America as represented by the Secretary of the Navy, Washington, D.C.

[22] Filed: May 15, 1974

[21] Appl. No.: 470,255

[52] U.S. Cl................. 128/2.07; 73/421.5 R; 73/23
[51] Int. Cl................................................ A61b 5/08
[58] Field of Search............ 128/2.08, 2.07, DIG. 29; 73/421.5 R, 23

[56] References Cited
UNITED STATES PATENTS

| | | | |
|---|---|---|---|
| 3,518,982 | 7/1970 | Timmins et al. | 73/23 |
| 3,523,529 | 8/1970 | Kissen | 128/2.07 |
| 3,533,398 | 10/1970 | Jones | 128/2.08 |
| 3,562,501 | 2/1971 | Mears | 73/23 |
| 3,621,833 | 11/1971 | Crane | 128/2.08 |
| 3,726,270 | 4/1973 | Griffis | 128/2.08 |
| 3,799,149 | 3/1974 | Rummel et al. | 128/2.08 |

FOREIGN PATENTS OR APPLICATIONS

| | | | |
|---|---|---|---|
| 1,508,303 | 11/1966 | France | 128/2.08 |

OTHER PUBLICATIONS

Hilberman et al., "On Line Assessment of Cardiac and Pulmonary Pathophysiology," JAA Med. Instr., Vol. 6, No. 1, J–F, 1972, pp. 65–69.

Yau et al., "Real-Time Analog and Alphanumeric TV Display for Patient Monitoring," Med. Instr., Vol. 7, No. 1, J–F, 1973, p. 85.

Comroe et al., "Design of Body Plethysmograph," J of App. Phys., Vol. 14, 1959, May, pp. 439–444.

*Primary Examiner*—Richard A. Gaudet
*Assistant Examiner*—Lee S. Cohen
*Attorney, Agent, or Firm*—Richard S. Sciascia; Don D. Doty; Harvey A. David

[57] ABSTRACT

A pulmonary function testing system is described, together with a method of testing, which system is characterized by sensing of flow, volume, pressure, and constituent parameters of respiratory gases, in a real time sense. Graphic recording of analog values of the parameters, concurrently and with high resolution during performance of various pulmonary maneuvers, reveals asymptomatic as well as symptomatic disease conditions.

3 Claims, 2 Drawing Figures

REAL-TIME CYCLIC PULMONARY FUNCTION TEST SYSTEM

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to improved pulmonary function testing methods and apparatus useful in the determination and treatment of various pulmonary conditions or diseases, some of which are symptomatic of various diseases and others of which are asymptomatic under ordinary circumstances but become important factors under extraordinary circumstances, for example in the case of divers who must breathe under hyperbaric conditions.

BACKGROUND OF THE INVENTION

Among the most important, but least recognized, phenomena relating to pulmonary functions are those of airway flutter, collapse/closure, two-phase gas flow, and gas trapping. These phenomena, which have a direct bearing on adequate alveolar gas exchange, are generally brought on during peak air movement in fast breathing maneuvers, and are related to certain physical characteristics of the conveying visco-elastic tubes (bronchi) such as cross-sectional shape, size, length, elasticity, hysteresis, wall thickness, surface roughness or anomalies, branches, and the like. Other factors are related to the gas itself such as viscosity, density, and velocity of flow.

While some of the foregoing factors and their interrelationships can be studied in various ways such as through dissection, simulation, and theoretical analysis, there has been a need for better, more comprehensive, and especially, more finite time related testing apparatus for deriving meaningful statistical data characteristic of human pulmonary functions in health, as well as data characteristic of asymptomatic and symptomatic disease. Such data can be evaluated with an eye toward earlier detection of disease and more effective treatment thereof, as well as toward determination of and improvement of occupational suitability, one example of the latter being selection and training of divers.

DISCUSSION OF THE PRIOR ART

Existing spirometric testing methods, apparatus, and interpretations of results, that have been common to pulmonary research have in general evolved from metabolic testing and are lacking in sufficient relation of the data to time within a breathing cycle for effective determination, study, and corrective application of results with respect to such transient and rapidly occurring events as airway flutter, collapse, and the like. Generally speaking, test results tabulated, displayed on meters, or graphically presented by tracing recorders are averages derived over a considerable period of time and do not accurately present rapid fluctuations in flow or pressure as they occur within a breathing cycle. Thus, although flow rates may be expressed in liters per second, that expression is one derived by integration of sensor output over a period of time and when plotted by a graphic recorder have failed to portray breaks or fluctuations in flow that occur in small fractions of a second. Similarly, data on oral pressure, which varies in a transient manner in fractions of a second with respect to such breaks or fluctuations in air flow, have not been adequately recognizable in the data derived from existing apparatus, because of inherent integration or filtering, and also because of the presence of valves, the actions of which serve to mask the actual airway and thoracic dynamic responses that could otherwise be seen in pure analog traces of flow and pressure data. One example of an apparatus that is capable of providing much useful data for conventional pulmonary function studies, but which is subject to the aforementioned shortcomings, is described in U.S. Pat. No. 3,759,249 to James C. Fletcher et al. Another example is provided in U.S. Pat. No. 3,726,270 to Roy A. Griffis et al. Other apparatus are limited in their ability to follow such rapid fluctuations by inherent slowness of response of flow and/or pressure sensors, particularly in the case of thermal flow sensors that rely on dissipation of heat from an element by passing gas, and in the case of captured air devices wherein the compressibility of large volumes of air and inertia of the equipment act to damp the responses thereof.

SUMMARY OF THE INVENTION

The present invention aims, among other objectives, to overcome many or all of the shortcomings of the prior art with respect to pulmonary function testing, evaluation and utilization of data through the provision of a comprehensive cyclic pulmonary testing system that operates on a substantially real time basis with adequate resolution with respect to short time duration events, while at the same time providing longer term data useful in analysis and/or treatment of subjects.

With the foregoing in mind, it is a principal object of the invention to provide an improved real time cyclic pulmonary test system capable of providing a plurality of suitably quantized and displayed data outputs.

Another object of the invention is the provision of a pulmonary test system that is particularly useful in detecting asymptomatic conditions in a subject which would produce effects that could be undesirable, and perhaps dangerous, for the subject in certain occupational environments such as are encountered in diving, caisson work, or the like.

Still another object of the invention is the provision of a system that can be used to advantage in teaching a subject who has some pulmonary function impairment, due for example to disease, accident, or the like, how to breathe in the most effective manner to achieve adequate alveolar ventilation.

Yet another object of the invention is the provision of a comprehensive system of the foregoing character that can be used to establish more meaningful standards or references against which various aspects of pulmonary functions can be evaluated.

Other objects and many of the attendant advantages will be readily appreciated as the subject invention becomes better understood by reference to the following detailed description, when considered in conjunction with accompanying drawings.

DESCRIPTION OF THE PREFERRED EMBODIMENT

Figure 1:
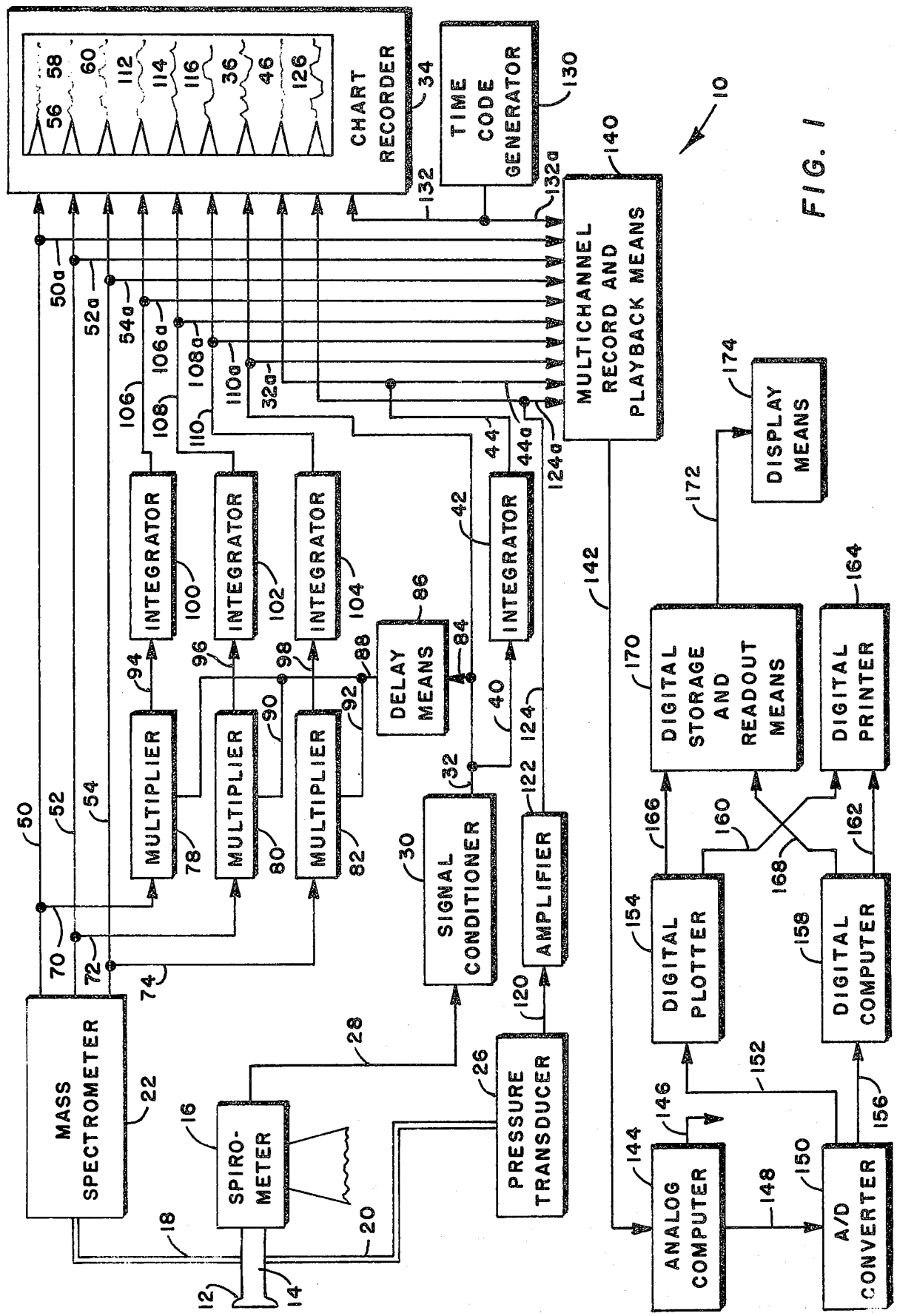
FIG. 1 is a diagrammatic illustration, in block form, of a pulmonary function testing system embodying the invention.

Referring to FIG. 1, an exemplary pulmonary function test system 10, embodying the invention comprises a suitable mouthpiece 12 that is adapted to be held in a subject's mouth, and is connected to a conduit 14. Conduit 14 is connected to a valveless and turbulence-free spirometer 16, and by branch conduits 18 and 20, respectively, to a mass spectrometer 22 and to a pressure transducer 26. Spirometer 16 may be of the type known as a wedge spirometer, a rolling seal spirometer, or a bi-phasic venturi device. Various examples of these flow sensing devices are available to workers in the art concerned, and the invention is not directed to the spirometer per se. Suffice it to say, however, that much of the success of the invention requires a spirometer or flow sensor that provides an output in the form of a position, electrical voltage, or current change that accurately follows, in an analog sense, the most minute perturbations in flow without the introduction or addition of masking output changes from the spirometer device itself.

The analog output of spirometer 16, represented by flow line 28, preferably in the form of a D.C. voltage signal and is applied to a signal conditioner 30 which, in the preferred embodiment, comprises an amplifier for converting the input analog signal to a corresponding output signal, suitable as an input to following components and representative of respiratory flow in liters per second. Thus, the output signal of conditioner 30 is applied, as shown by line 32, as one input to a multiple channel chart recorder 34 which produces a trace 36 graphically depicting, on a substantially real time basis, respiratory flow in liters/second.

The output of signal conditioner 30 is further applied, via line 40, to an integrator 42. Integrator 42 integrates the varying flow rate values with respect to time during each respiration/ expiration period to provide an output voltage on line 44 representative of volume in liters. The output of integrator 42 is applied to chart recorder 34 to produce a trace 46 graphically depicting the volume V of respiratory gas in a subject's lungs in relation to time in a respiratory cycle.

Mass spectrometer 22 is conveniently of the type that continuously draws a stream of sample gas from the area to be tested. Thus, conduit 16 comprises a very small diameter tube through which a small amount of gas is drawn, the amount being insignificant with respect to the volumes of gas breathed in and out. Spectrometer 22 provides three analog voltage outputs representative of the partial pressures, in expired gases, of $N_2$ (nitrogen), $O_2$ (oxygen), and $CO_2$ (carbon dioxide). These are applied, as shown respectively by lines 50, 52, and 54, to chart recorder 34 to provide traces 56, 58, and 60 representative of those components in mm Hg (millimeters of mercury).

The mass spectrometer outputs are also applied, as shown respectively by lines 70, 72, and 74, as first inputs to analog multipliers 78, 80, and 82. Multipliers 78, 80, and 82 each receive, as a second input, a time delayed, flow representing analog signal, derived from the output of signal conditioner 30 via line 32, line 84, time delay means 86, and lines 88, 90, and 92.

The outputs of multipliers 78, 80, and 82 are representative of the flow rates of $N_2$, $O_2$, and $CO_2$, and are applied as shown respectively by lines 94, 96, and 98 to integrators 100, 102, and 104. These integrators integrate the input signals thereto with respect to time to provide output signals, as shown by lines 106, 108, and 110, representative of volumes in cc (cubic centimeters) of $N_2$, $O_2$, and $CO_2$ per breath, for graphic presentation on strip chart recorder 34. These volumes are represented by traces 112, 114, and 116, respectively.

Pressure transducer 26 provides, as its output, an analog voltage signal on line 120 to an amplifier 122. The outputs of the pressure transducer and of amplifier 122 on line 124 to strip recorder 34 are analogous of oral pressures during inspiratory and expiratory pulmonary function maneuvers. Recorder 34 provides a graphic trace 126 of such oral pressures, measured in inches of $H_2O$, or centimeters thereof.

All of the various traces 36, 46, 56, 58, 60, 112, 114, 116, and 126 are generated concurrently and are referenced to time by the advancing strip of recording material which is driven by a suitable motor. Moreover, because it is advantageous at times to drive the chart strip at different speeds for different pulmonary maneuvers, a time code generator 130 provides timing signals, via line 132 to recorder 34, at one second intervals for indication on the chart record.

System 10 advantageously further comprises a multiple channel recording and playback apparatus 140, conveniently of the magnetic tape type, which receives all of the same inputs as recorder 34 via lines 32a, 44a, 50a, 52a, 54a, 106a, 108a, 110a, 124a, and 132a. Recording and playback apparatus 140 stores the analog data for later computational analysis, comparison, display, diagnosis, or other uses.

Playback of the recorded data from all channels is collectively represented by flow line 142 showing application of the analog data to an analog computer 144, forming part of a data reduction portion of the system wherein data is reduced to various useable forms. The actual transmission of the data may be by wire cable, phone line or by radio, depending upon the circumstances of use of the system and the remoteness of the data reduction portion thereof.

Analog computer 144 may be a general purpose computer, programmed to recognize certain relationships between the analog data inputs that are meaningful to the practitioner or operator of the system and also to perform any scaling, normalizing, integrating or other processing of data that may be desirable for use in following elements of the system. The existence of such relationships is diagrammatically shown by output line 146, while the multi-channel passage of data after processing is collectively shown by line 148. The data in these channels are fed to an analog to digital converter 150 that digitizes each channel of data. The outputs of converter 150 are applied via line 152 to a digital plotter 154 for plotting flows, volumes, cycles, etc., and via line 156 to a digital calculator 158 for determining various parameters of interest to the investigator.

The outputs of plotter 154 and of calculator 158 may be applied as shown by lines 160, 162 to a digital printer 164 and by lines 166, 168 to a storage or memory means 170. Storage means 170 may be read out via line 172 to a display means 174, for example of the cathode ray tube type, chart recorder, or other type.

MODE OF OPERATION

The present invention contemplates the performance of one or more of at least five fast and slow pulmonary function maneuvers by a subject whose respiration is to be analyzed through the use of system 10. These maneuvers cover the total dynamic, slow and fast capability of an individual and, when performed with system 10, provide essential respiratory mechanics data not heretofore available to the clinician, medical practitioner, engineer, or health and safety regulatory officials. The five pulmonary function maneuvers, for each of which pressures, volumes, and flow rates are concurrently recorded in real time by recorder 34, as well as partial pressures of $O_2$, $CO_2$, and $N_2$ (plus other inert gases), include a maximum expiratory flow rate maneuver, a slow vital capacity maneuver, a tidal volume maneuver, a maximum breathing capacity maneuver, and a maximum ventilation volume maneuver. The following are the basic instructions and the information derived from each of the mentioned maneuvers:

A. Maximum Expiratory Flow Rate (MEFR). The subject is instructed to place the mouthpiece in his mouth and breathe normally for several breaths. Then, take a maximum inspiration followed immediately by a maximum effort expiration. A nose clamp is used throughout all tests. The spirometer is flushed until the mass spectrometer shows sea level values for $PO_2$ and $PCO_2$ before each test. When biphasic venturi flow sensors are used this is not necessary.

1. Data Analysis
   a. Maximum expiratory flow rate (MEFR)
   b. Maximum expiratory volume (MEV)
   c. Oxygen uptake $ccO_2$ (or L/min)
   d. Carbon dioxide output cc $CO_2$ (or L/Min)
   e. Minimum partial pressure $PO_2$ mm Hg
   f. Maximum partial pressure $PCO_2$ mm Hg
   g. Respiratory gas exchange ratio
   h. Anatomical deadspace
   i. Physiological deadspace
   j. Oral pressure.

B. Slow Vital Capacity Maneuver (VC). The subject is instructed to place the mouthpiece in his mouth and breathe normally for several breaths. Then, take a full slow inspiration followed by a full slow expiration. Emphasis is placed upon maximum volume of gas inspired and expired slowly.

1. Data Analysis.
   a. Inspiratory flow rate (IR)
   b. Inspiratory volume (IV)  c. Expiratory flow rate (EFR)
   d. Expiratory volume (EV)
   e. Vital capacity (VC) liters
   f. Gas trapped (VC - MEV)
   g. Oxygen uptake cc $O_2$ (or L/min)
   h. Carbon dioxide output cc $PCO_2$ (or L/min)
   i. Difference in VC $PCO_2$ - MEF $PCO_2$
   j. Minimum partial pressure $PO_2$
   k. Maximum partial pressure $PCO_2$
   l. Respiratory gas exchange ratio
   m. Anatomical deadspace
   n. Oral pressure.

C. Tidal Volume (TV). The subject is instructed to place the mouthpiece in his mouth and breathe normally while 6 to 10 respiratory cycles are recorded.
1. Data Analysis
   a. Inspiratory flow rate (IFR)
   b. Inspiratory volume (IV)
   c. Expiratory flow rate (EFR)
   d. Expiratory volume (EV)
   e. Average tidal volume (TV)
   f. Respiratory rate, breaths (min)
   g. Oxygen uptake $CCO_2$ (or L/min)
   h. Carbon dioxide output cc $O_2$ (or L/min)
   i. Respiratory gas exchange ratio
   j. Estimated venous $PCO_2$
   k. Estimated arterial $PCO_2$
   l. Estimated cardiac output - indirect Fick
   m. Airway flutter frequency - inspiration and expiration
   n. Anatomical deadspace
   o. Oral pressure D. Maximum Breathing Capacity (MBC). The subject is instructed to place the mouthpiece in his mouth and breathe several normal breaths. Then, at the end of an expiration he is prompted to breathe as hard and fast as he can. Emphasis is placed upon maximum effort. Respiratory cycles are recorded for 15 20 seconds.

1. Data Analysis
   a. Maximum inspiratory flow rate (MIFR). (L/sec)
   b. Maximum inspiratory volume (MIEV)
   c. Maximum expiratory flow rate (MEFR). (L/sec)
   d. Maximum expiratory volume (MEV)
   e. Expiratory flow rate at beginning of airway collapse (L/sec)
   f. Inspiratory flutter frequency
   g. Expiratory flutter frequency
   h. Oxygen uptake cc $O_2$ (or L/min)
   i. Carbon dioxide output cc $CO_2$ (or L/min)
   j. Minimum partial pressure $PO_2$
   k. Maximum partial pressure $PCO_2$
   l. Respiratory gas exchange ratio
   m. Estimated venous $PCO_2$
   n. Estimated arterial $PCO_2$
   0. Estimated cardiac output - indirect Fick
   p. MBC average volume change per breath
   q. MBC respiratory rate
   r. First fast cycle MBC
      (1) inspiratory volume
      (2) expiratory volume
      (3) Volume gas trapped (IV - EV)
      (4) $PCO_2$ before first MBC cycle
      (5) $PCO_2$ at first MBC expiration
      (6) $PCO_2$ difference before and after MBC
   s. Physiological deadspace
   t. Oral pressure.

E. Maximum Ventilation Volume (MVV). The subject is instructed to place the mouthpiece in his mouth and breathe several normal breaths. Then, at the end of an expiration, he is prompted to breathe as fast - and deep as he can. Emphasis is placed upon maximum effort. Respiratory cycles are recorded for 15 to 20 seconds.

1. Data Analysis - The same type data is obtained as listed for MBC above, but substituting MVV wherever MBC appears.

As mentioned earlier, chart speeds on recorder 34 are selected to suit the particular maneuver being performed. For the MEFR maneuver a chart speed of 5 or 10 mm/sec is satisfactory; for VC, 5 mm/sec; for Tv, 5 mm/sec; for MBC and MVV, 5 mm/sec at beginning and switching to 25 min/sec just before the maximum effort maneuver. In any event, it is important to best practice of the testing techniques involved to perform the recording with adequate resolution to provide definition of physiological events that occur in mere fractions of a second, as is the case with pressure changes and flow rate changes upon the occasions of airway flutter, collapse, or closure.

One of the more significant conditions, detectable by the system 10 and the method of testing according to the invention, is that of gas trapping in a subject. This phenomena is evidenced by differences in volumes of gas inspired and expired say during a maximum speed/effort maneuver, as compared to a slow maximum volume maneuver. The comparison of recording traces readily reveals the extent of gas trapping and its relationship to airway flutter, collapse, or closure. While these conditions, unrecognized in the art prior to this invention, are found in subjects that are otherwise asymptomatic, they are of great significance in the recognition of incipient disease and in predicting the ability of a subject to adapt to certain situations such as are peculiar to various occupations including diving, working in an unclean atmosphere, and the like.

Figure 2:
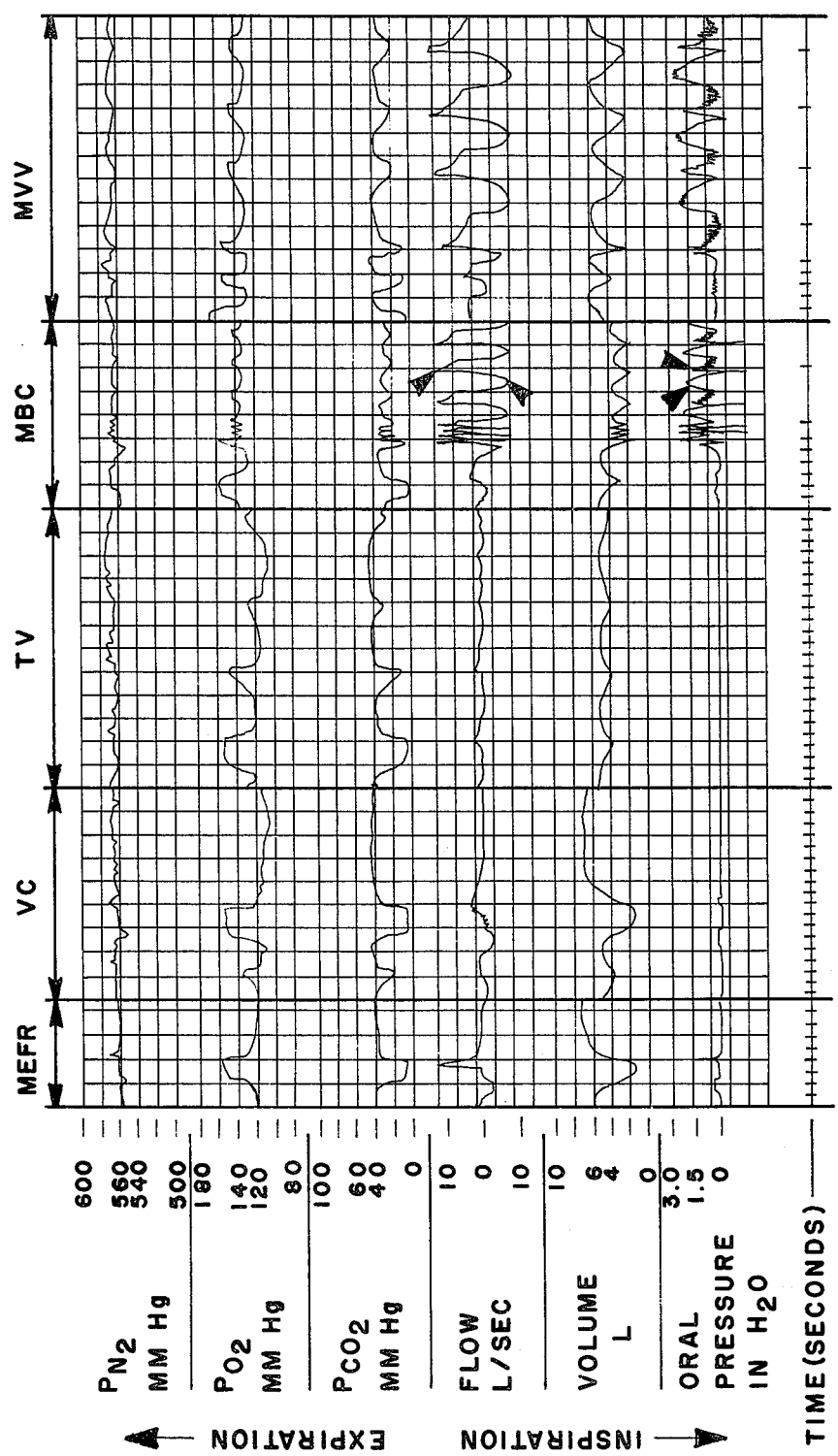
FIG. 2 is a representative illustration of graphic traces obtained from the system of FIG. 1.

Referring to FIG. 2, representative traces made in the testing of an asymptomatic male subject, age 33, are illustrative of the determination of airway flutter, and gas trapping. The points indicated by the arrows on traces 36 and 126 reveal airway collapse and corresponding breaks in pressure and flow. In the MBC portion of trace 46, there is clearly indicated a condition of substantial gas trapping during the maximum effort portion of the maneuver, and correlated in time with the onset of airway collapse.

This subject was tested as a diving candidate and an analysis of his pulmonary function testing shows:

| | | |
|---|---|---|
| Maximum expiratory flow rate (MEFR) | | 12.5 L/sec |
| Maximum expiratory volume (MEV) | | 5.5 L |
| | end $PO_2$ | 104 mmHg |
| | end $PCO_2$ | 35 mmHg |
| Vital capacity (VC) | | 5.9 L |
| | end $PO_2$ | 106 mmHg |
| | end $PCO_2$ | 40 mmHg |
| | gas trapped | 0.4 L |
| Tidal volume (TV) | | 1.0 L |
| Inspiratory flow rate | | 0.6 L/sec |
| Expiratory flow rate | | 1.5 L/sec |
| | end $PO_2$ | 106 mmHg |
| | end $PCO_2$ | 36 mmHg |
| Respiratory gas exchange ratio | | 0.34 |
| Respiratory rate | | 9 B/min |
| Maximum breathing capacity (MBC) | | |
| Inspiratory flow rate | | 9.3 L/sec |
| Expiratory flow rate | | 12.0 L/sec |
| | Avrg volume | 1.8L |
| Gas trapped 1st fast expiration | | 1.6L |
| Maximum ventilation volume (MVV) | | |
| Inspiratory flow rate | | 9.2 L/sec |
| Expiratory flow rate | | 12.2 L/sec |
| | Avrg volume | 3.8 L |
| Gas trapped 1st fast expiration | | 0 |
| Gas trapped 2nd fast expiration | | 0.6 L |

Comments: This pulmonary function test is typical of a normal adult male who is an abnormal gas trapper. He is classified as having asymptomatic respiratory disease caused by airway collapse trapping gas in excess of 0.7 liters during either MEFR, MBC, or MVV maneuvers. Note the steep up slope of the first two expirations flow traces during normal breathing which rounds out by the fourth cycle. Such a sharp up slope is an indication of positive expiration. Again there is a significant difference in the volume per breath between the MBC and MVV maneuvers.

Because of the substantially real time, graphic display capabilities of the system 10, including both chart recorder 34 and display means 174, the system is particularly useful in teaching persons with impaired pulmonary functions how to breathe to best advantage. In this regard, synthesized or actual breathing parameters that would be suitable for a selected patient can be placed in the storage and readout means 170, and one or more thereof display simultaneously on the display means with a corresponding parameter of the patient. This provides the patient with a visual guide by which he can quickly learn to cause his breathing pattern to approximate or mimic the pattern to be learned.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A pulmonary function testing system comprising in combination:

valveless conduit means adapted to conduct respiratory gases to and from a subject during pulmonary maneuvers;

valveless spirometer means, connected to said conduit means, for generating first analog signals representative of flow rates of said respiratory gases;

mass spectrometer means, connected to said conduit means, for generating second analog signals representative of partial pressures of constituents of said respiratory gases, said second analog signals being characterized by being out of phase in time a predetermined amount relative to corresponding occurrences of flow rate fluctuations in said respiratory gases;

pressure transducer means, connected to said conduit means, for generating third analog signals representative of oral pressures in said respiratory gases;

time delay means, connected to receive said first analog signals, for providing delayed first analog signals that are retarded in time by said predetermined amount;

multiplier means, connected to said mass spectrometer means and to said delay means, for providing fourth analog signals as products of said delayed first analog signals and said second analog signals and representative of volumes of said respiratory gas constituents per breath; and multiple channel chart recorder means, coupled to said spirometer means, to said mass spectrometer means, to said pressure transducer means and to said multiplier means, for concurrently providing individual graphic traces of said first, second, third, and fourth analog signals with reference to time, whereby the simultaneous effects of physiological events on said flow rates, said oral pressures, said partial pressures, and said volumes of said respiratory gases are depicted in substantially real time and with time parity existing between traces of said flow rate fluctuations and of said partial pressures of constituents of said respiratory gases.

2. A pulmonary function testing system as defined in claim 1, and further comprising:

integrator means, coupled to said spirometer means, for integrating said first analog signals to provide fifth analog signals representative of volume of said respiratory gases per breath; and said chart recorder means is responsive to said fifth analog signals to provide an individual graphic trace of said volume of said respiratory gases per breath.

3. A pulmonary function testing system as defined in claim 2, and further comprising:

time code generator means, connected to said chart recorder means, for providing time signals thereto at predetermined intervals.

\* \* \* \* \*